US012791165B2

(12) United States Patent
Chen et al.

(10) Patent No.: US 12,791,165 B2
(45) Date of Patent: Nov. 10, 2026

(54) LASER LIGHT COMBINING APPARATUS AND LIGHT SOURCE

(71) Applicant: YLX INCORPORATED, Shenzhen (CN)

(72) Inventors: Bin Chen, Shenzhen (CN); Jinjiang Fu, Shenzhen (CN)

(73) Assignee: YLX INCORPORATED, Shenzhen (CN)

( * ) Notice: Subject to any disclaimer, the term of this patent is extended or adjusted under 35 U.S.C. 154(b) by 31 days.

(21) Appl. No.: 18/880,207

(22) PCT Filed: Jul. 5, 2023

(86) PCT No.: PCT/CN2023/105784
§ 371 (c)(1),
(2) Date: Dec. 30, 2024

(87) PCT Pub. No.: WO2024/008103
PCT Pub. Date: Jan. 11, 2024

(65) Prior Publication Data

US 2026/0117954 A1 Apr. 30, 2026

(30) Foreign Application Priority Data

Jul. 8, 2022 (CN) ......................... 202210806825.7
Jul. 8, 2022 (CN) ......................... 202221779338.8

(51) Int. Cl.
*F21V 7/30* (2018.01)
*F21V 5/04* (2006.01)
(Continued)

(52) U.S. Cl.
CPC ................ *F21V 7/30* (2018.02); *F21V 5/043* (2013.01); *F21V 7/0066* (2013.01); *F21V 7/24* (2018.02); *F21V 9/32* (2018.02)

(58) Field of Classification Search
CPC . F21V 7/0066; F21V 7/24; F21V 7/30; F21V 5/043; F21V 9/32
(Continued)

(56) References Cited

U.S. PATENT DOCUMENTS

| | | | | |
|---|---|---|---|---|
| 2019/0187545 | A1 | 6/2019 | Arakawa | |
| 2020/0409250 | A1 | 12/2020 | Zhang et al. | |
| 2021/0382382 | A1* | 12/2021 | Koizumi | G03B 21/2066 |

FOREIGN PATENT DOCUMENTS

| | | | |
|---|---|---|---|
| CN | 101467266 | A | 6/2009 |
| CN | 206946178 | U | 1/2018 |

(Continued)

OTHER PUBLICATIONS

ISA China National Intellectual Property Administration, International Search Report Issued in Application No. PCT/ CN2023/ 105784, Nov. 30, 2023, WIPO, 8 pages.

(Continued)

*Primary Examiner* — Thomas M Sember
(74) *Attorney, Agent, or Firm* — McCoy Russell LLP

(57) ABSTRACT

A laser light combining apparatus. The laser light combining apparatus comprises a light splitting element and a wavelength conversion element. The light splitting element is used for reflecting a portion of a laser incident at the side of the light splitting element facing away from the wavelength conversion element, so as to form a first wavelength beam, and used for transmitting the unreflected portion of the laser to the wavelength conversion element the wavelength conversion element is used for performing wavelength conversion on the unreflected portion of the laser to form a second wavelength beam, and reflecting the second wavelength beam to the light splitting element, so that the second wavelength beam and the first wavelength beam form combined light, where the divergence angle of the first wave-
(Continued)

1 length beam and the divergence angle of the second wavelength beam are both greater than the divergence angle of the laser.

19 Claims, 8 Drawing Sheets

(51) Int. Cl.

| | |
|---|---|
| ***F21V 7/00*** | (2006.01) |
| ***F21V 7/24*** | (2018.01) |
| ***F21V 9/32*** | (2018.01) |

(58) Field of Classification Search
USPC .................................................. 362/259, 293
See application file for complete search history.

(56) References Cited

FOREIGN PATENT DOCUMENTS

| | | | |
|---|---|---|---|
| CN | 110887022 | A | 3/2020 |
| CN | 111425820 | A | 7/2020 |
| CN | 113494685 | A | 10/2021 |
| CN | 215264353 | U | 12/2021 |
| CN | 114135801 | A | 3/2022 |
| CN | 218480555 | U | 2/2023 |
| WO | 2021184842 | A1 | 9/2021 |

OTHER PUBLICATIONS

European Patent Office, Extended European Search Report Issued in Application No. 23834870.0, Apr. 17, 2026, 1 Germany, 9 pages.

* cited by examiner

LASER LIGHT COMBINING APPARATUS AND LIGHT SOURCE

CROSS REFERENCE TO RELATED APPLICATIONS

The present application is a U.S. National Phase of International Application No. PCT/CN2023/105784 entitled "LASER LIGHT COMBINING APPARATUS AND LIGHT SOURCE," and filed on Jul. 5, 2023. International Application No. PCT/CN2023/105784 claims priority to Chinese Patent Application No. 202210806825.7 filed on Jul. 8, 2022, and to Chinese Patent Application No. 202221779338.8 filed on Jul. 8, 2022. The entire contents of each of the above-listed applications are hereby incorporated by reference for all purposes.

TECHNICAL FIELD

The present disclosure relates to the technical field of illumination, and in particular, to a laser light combining apparatus and a light source.

BACKGROUND

The existing light source can satisfy the requirements of small power, small size of lighting equipment, long-distance irradiation, light extraction efficiency and central light intensity. However, the light spots emitted by the existing light source is white in the middle and yellow at the edge, and thus has a poor color uniformity.

In addition, in the related art, in order to satisfy usage requirements, an optical path usually needs to be processed complexly, which requires high power and complex heat dissipation, and results in a complex structure generally, a relatively large overall volume of the device, and relatively high manufacturing costs.

SUMMARY

A main object of the present disclosure is to provide a laser light combining apparatus and a light source, aiming at solving at least one technical problem in the related art.

In order to solve the above-mentioned problems, the present disclosure provides a laser light combining apparatus. The laser light combining apparatus includes an optical splitting element and a wavelength conversion element. The optical splitting element is configured to reflect a portion of laser incident at a side of the optical splitting element away from the wavelength conversion element to form a first wavelength beam, and transmit an unreflected portion of the laser to the wavelength conversion element. The wavelength conversion element is configured to perform wavelength conversion on the unreflected portion of the laser to form a second wavelength beam, and reflect the second wavelength beam to the optical splitting element, so that the second wavelength beam and the first wavelength beam form a combined light. A divergence angle of the first wavelength beam and a divergence angle of the second wavelength beam are both greater than a divergence angle of the laser.

In order to solve the above-mentioned problems, the present disclosure provides a light source including a laser device and the above-mentioned laser light combining apparatus. The laser device is configured to emit laser light. The laser light combining apparatus is configured to receive the laser light, separate and convert the laser light and then combine to form a combined light of the first wavelength beam and the second wavelength beam.

Compared with the related art, the laser light combining apparatus of the present disclosure includes: an optical splitting element and a wavelength conversion element. The optical splitting element is configured to reflect a portion of laser incident at a side of the optical splitting element away from the wavelength conversion element to form a first wavelength beam, and transmit an unreflected portion of the laser to the wavelength conversion element. The wavelength conversion element is configured to perform wavelength conversion on an unreflected portion of the laser to form a second wavelength beam, and reflect the second wavelength beam to the optical splitting element, so that the second wavelength beam and the first wavelength beam form a combined light. A divergence angle of the first wavelength beam and a divergence angle of the second wavelength beam are both greater than a divergence angle of the laser. In this way, the optical splitting element reflects a portion of the laser to form a reflected laser, that is, the first wavelength laser. The optical splitting element transmits a portion of the laser to the wavelength conversion element, so that the wavelength conversion element is excited to generate fluorescence, that is, the second wavelength beam. Moreover, the divergence angle of the first wavelength beam and the divergence angle of the second wavelength beam are both greater than the divergence angle of the laser, so that the combined light formed by the first wavelength beam and the second wavelength beam can have a relatively high color uniformity. Meanwhile, the method for forming the combined light is simple, which results in a compact structure and relatively low manufacturing costs.

BRIEF DESCRIPTION OF DRAWINGS

In order to more clearly describe the technical solutions of embodiments of the present disclosure or the related art, the drawings desired in these embodiments will be briefly described as follows. It is appreciated that, apparently, the drawings described below are merely some embodiments of the present disclosure, and for those skilled in the art, other drawings can also be obtained based on these drawings without any creative effort.

Figure 1:
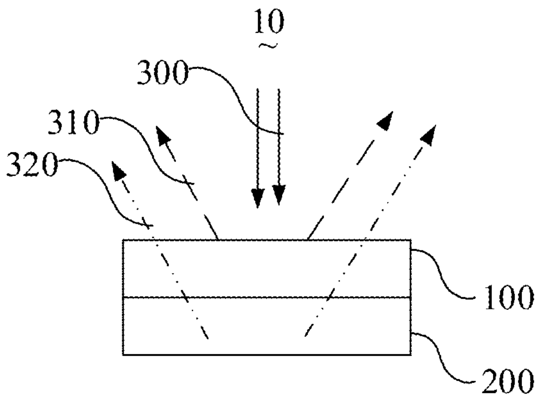
FIG. 1 is a schematic structural diagram of a laser light combining apparatus according to an embodiment of the present disclosure.

Reference signs: laser light combining apparatus 10; optical splitting element 100; wavelength conversion element 200; laser 300; first wavelength beam 310; second wavelength beam 320; fluorescent layer 210; reflective layer 220; glass layer 110; scattering layer 120; middle region 130; peripheral region 140; through hole 150; anti-reflection coating 160; frosted glass 170; heat dissipation substrate 400; light source 1; laser device 20; compressing lens 30; mirror 40; diffuser 50; reflecting prism 60; collecting lens 70; diaphragm 80.

DESCRIPTION OF EMBODIMENTS

The technical solutions in embodiments of the present disclosure will be clearly and completely described below in combination with the accompanying drawings in these embodiments of the present disclosure. It can be understood that the specific embodiments described herein are merely used to explain the present disclosure, and are not intended to limit the present disclosure. It should also be noted that, for ease of description, only some, but not all, of the structures related to the present disclosure are shown in the drawings. All other embodiments obtained by those skilled in the art based on embodiments of the present disclosure shall fall within the scope of the present disclosure.

The terms "first", "second", and "third" in the present disclosure are merely used for descriptive purposes, and cannot be understood as indicating or implying relative importance or implicitly indicating a quantity of indicated technical features. Therefore, features defined by "first", "second", "third" may explicitly or implicitly include at least one of the features. In the description of the present disclosure, "a plurality of" means at least two, for example, two, three, and the like, unless specifically defined otherwise. In this embodiment of the present disclosure, all directional indications (such as upper, lower, left, right, front, and back) are merely used to explain a relative position relationship, a motion status, and the like between components in a specific posture (as shown in the figures). If the specific posture changes, the directional indication changes accordingly. Furthermore, the terms "comprising", "including", "having" and any variations thereof are intended to cover non-exclusive inclusion. For example, a process, a method, a system, a product, or a device containing a series of steps or units may not be limited to the listed steps or units, but also may optionally include steps or units which are not listed, or also may optionally include other steps or units inherent to the process, the method, the product, or the device.

The expression "embodiments" mentioned herein means that particular features, structures or characteristics described with reference to the embodiments can be included in one or more embodiments of the present disclosure. Phrases appearing at various positions of the specification neither always refer to the same embodiments, nor separate or alternative embodiments that are mutually exclusive with other embodiments. It should be explicitly and implicitly understood by those skilled in the art that these embodiments described herein can be combined with other embodiments.

FIG. 1 is a schematic structural diagram of a laser light combining apparatus 10 according to an embodiment of the present disclosure.

The laser light combining apparatus 10 according to the present disclosure includes: an optical splitting element 100 and a wavelength conversion element 200.

The optical splitting element 100 is capable of partially transmitting and partially reflecting laser 300. The optical splitting element 100 is configured to reflect a portion of the laser 300 incident at a side of the optical splitting element 100 away from the wavelength conversion element 200, to form a first wavelength beam 310 with an increased divergence angle, and transmit an unreflected portion of the laser 300 to the wavelength conversion element 200.

The wavelength conversion element 200 is configured to perform wavelength conversion on the unreflected portion of the laser 300 to form a second wavelength beam 320, and reflect the second wavelength beam 320 to the optical splitting element 100, so that the second wavelength beam 320 and the first wavelength beam 310 form a combined light. A divergence angle of the first wavelength beam 310 and a divergence angle of the second wavelength beam 320 are both greater than a divergence angle of the laser 300.

In this way, the optical splitting element 100 reflects a portion of the laser 300 to form a reflected laser, that is, the first wavelength beam 310. The optical splitting element 100 transmits a portion of the laser 300 to the wavelength conversion element 200, so that the wavelength conversion element 200 is excited to generate fluorescence, that is, the second wavelength beam 320. Moreover, a divergence angle of the first wavelength beam 310 and a divergence angle of the second wavelength beam 320 are greater than a divergence angle of the laser 300, so that the combined light formed by the first wavelength beam 310 and the second wavelength beam 320 has a relatively high color uniformity. Meanwhile, the method for forming the combined light is simple, which results in a compact structure and relatively low manufacturing costs.

The overlapping area of the divergence angle of the first wavelength beam 310 and the divergence angle of the second wavelength beam 320 is greater than or equal to 80%. The overlapping area of the divergence angle of the first wavelength beam and the second wavelength beam can be obtained in the following calculation manner: overlapping area volume/(overlapping area volume+non-overlapping area volume). In order to further improve the color uniformity of the combined light, the values of the divergence angle of the first wavelength beam 310 and the divergence angle of the second wavelength beam 320 can be substantially the same, that is, the overlapping area of the above two can be approximately equal to 100%, so that the sizes of the light spots formed by the first wavelength beam 310 and the second wavelength beam 320 are substantially the same, thereby further improving the color uniformity of the combined light.

Figure 2:
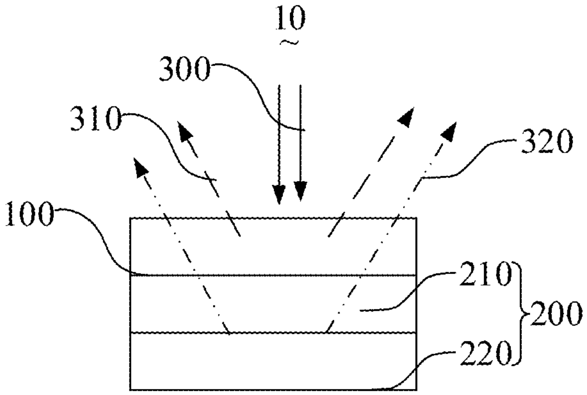
FIG. 2 is a schematic structural diagram of a laser light combining apparatus according to an embodiment of the present disclosure.

FIG. 2 is a schematic structural diagram of a laser light combining apparatus 10 according to an embodiment of the present disclosure.

The wavelength conversion element 200 may include a fluorescent layer 210 and a reflective layer 220. The fluorescent layer 210 is arranged between the optical splitting element 100 and the reflective layer 220.

The fluorescent layer 210 can be made of fluorescent material, which can be wavelength conversion material of a blue light segment, a green light segment, a yellow light segment, or a red light segment. The fluorescent layer 210 can receive the laser 300 and excite the fluorescent material through the laser 300 to generate the second wavelength beam 320. The fluorescent material may include fluorescent glass, fluorescent silica gel, fluorescent single crystal, fluorescent ceramic, fluorescent composite ceramic, and so on.

The reflective layer 220 can be configured to reflect the first wavelength beam 310. The reflective layer 220 can be metal reflective layer or inorganic reflective layer. The metal reflective layer can form a metal layer (such as a silver layer) through metal material. The inorganic reflective layer 220 is formed of reflective particles or scattering particles and matrix. The reflective particles or scattering particles may be silicon nitride, aluminum oxide, aluminum nitride, magnesium oxide, barium sulfate, titanium dioxide, zirconium oxide, zinc oxide, boron nitride, aluminum nitride, silicon carbide, aluminum borate, etc. The matrix may be silica gel or glass.

In this embodiment, the fluorescent layer 210 receives a portion of the laser 300 that is not reflected by the optical splitting element 100. The fluorescent material is excited by the laser 300 to generate a second wavelength beam 320. The generated second wavelength beam 320 is reflected by the reflective layer 220 to the optical splitting element 100.

The laser 300 is incident at the side of the optical splitting element 100 away from the wavelength conversion element 200. The laser 300 is split by the optical splitting element 100 into the laser 300 for exciting the fluorescent material in the fluorescent layer 210 and the first wavelength beam 310 for mixing with the second wavelength beam 320 to form a combined light. Therefore, the color of the combined light can be adjusted by mixing the first wavelength beam 310 and the fluorescence-excited second wavelength beam 320, and the color of the combined light may be white, red, green, yellow, and so on.

In an embodiment, the optical splitting element 100 may be frosted glass. A side surface of the optical splitting element 100 close to the wavelength conversion element 200 and a side surface of the optical splitting element 100 away from the wavelength conversion element 200 are both atomized. The laser 300 can be incident at an atomized side surface of the frosted glass facing away from the wavelength conversion element 200, in order to enlarge a divergence angle of the laser 300 through the atomized surface. Then the laser 300 is partially reflected and partially transmitted through the Fresnel reflection phenomenon of glass material in the frosted glass. The portion of the reflected laser 300 serves as the first wavelength beam 310. The transmitted laser 300 serves as excitation light to excite the fluorescent material of the wavelength conversion element 200, to form the second wavelength beam 320. Both the first wavelength beam 310 and the second wavelength beam 320 pass through the atomized surface of the frosted glass, so that divergence angles of the first wavelength beam 310 and the second wavelength beam 320 are both greater than a divergence angle of the laser 300, thereby resulting in higher color uniformity of the combined light formed by the first wavelength beam 310 and the second wavelength beam 320.

Figure 3:
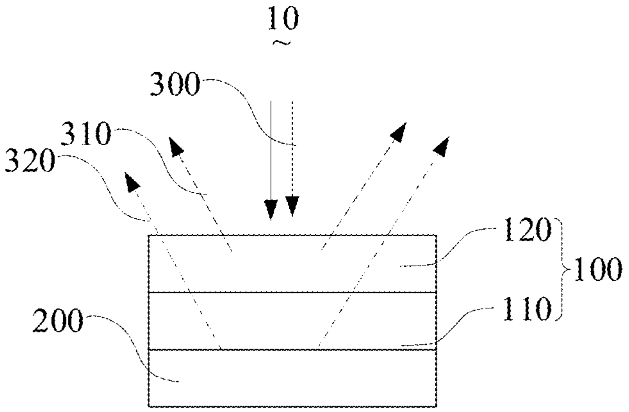
FIG. 3 is a schematic structural diagram of a laser light combining apparatus according to an embodiment of the present disclosure.

FIG. 3 is a schematic structural diagram of a laser light combining apparatus 10 according to an embodiment of the present disclosure.

In an embodiment, the optical splitting element 100 includes a glass layer 110 and a scattering layer 120. The glass layer 110 is arranged between the scattering layer 120 and the wavelength conversion element 200. The glass layer 110 can be made of glass material. By partially reflecting and partially transmitting the laser 300 through the Fresnel reflection phenomenon of the glass material, and the scattering layer 120 can increase a divergence angle of the laser 300. In FIG. 3, the laser 300 is incident into the scattering layer 120. The divergence angle of the laser 300 is increased through the scattering layer 120. The laser 300 with the increased divergence angle is transmitted to the glass layer 110. Through the Fresnel reflection phenomenon of the glass material in the glass layer 110, the laser 300 is partially reflected and partially transmitted. The reflected laser 300 forms a first wavelength beam 310, and the transmitted laser 300 enters the wavelength conversion element 200, to form a second wavelength beam 320. In this embodiment, since the laser 300 is scattered by the scattering layer 120, the divergence angles of the first wavelength beam 310 and the second wavelength beam 320 are both greater than the divergence angle of the laser 300, thereby resulting in a relatively high color uniformity of the combined light formed by the first wavelength beam 310 and the second wavelength beam 320. The scattering layer 120 and the glass layer 110 can be integrally provided. The optical splitting element 100 formed by mixing titanium dioxide and pores in the glass material has a function of scattering the laser 300. The laser 300 can be partially reflected and partially transmitted through the Fresnel reflection phenomenon of the glass material.

In an embodiment, the optical splitting element 100 may be a diffuser. The laser 300 is incident into the diffuser, and split by Fresnel reflection of the diffuser. The split laser 300 is partially reflected and partially transmitted. The partially reflected laser 300 forms the first wavelength beam 310, and the partially transmitted laser 300 is incident into the wavelength conversion element 200. The diffuser can be formed by adding chemical particles as scattering particles into the diffusion film substrate. The scattering particles are located in the diffusion film substrate. After receiving the laser 300 through the diffuser, the laser 300 will continuously penetrate the scattering particles with different refractive indexes when passing through the diffusion layer, thereby realizing refraction, reflection and scattering of the laser 300. In this embodiment, thanks to the diffuser as the optical splitting element 100, the divergence angles of the first wavelength beam 310 and the second wavelength beam 320 are both greater than the divergence angle of the laser 300, and simultaneously the angles of the first wavelength beam 310 and the second wavelength beam 320 are substantially the same. Therefore, the color uniformity of the combined light formed by the first wavelength beam 310 and the second wavelength beam 320 is relatively high.

In an embodiment, the optical splitting element 100 includes an optical splitting film layer (not shown) adhered to the fluorescent layer of the wavelength conversion element 200. The optical splitting film layer includes glass material and scattering particles doped in the glass material. The light splitting layer may include glass material, and scattering particles such as $TiO_2$, $Al_2O_3$, and pores are doped in the glass material. The wavelength conversion element 200 may include a fluorescent layer 210 and a reflective layer 220. The fluorescent layer 210 is provided between the optical splitting element 100 and the reflective layer 220. The fluorescent layer 210 can be made of fluorescent material. The fluorescent material may be wavelength conversion material of a blue light segment, a green light segment, a yellow light segment, or a red light segment. The optical splitting film layer can be directly bonded to the fluorescent material of the fluorescent layer. In this embodiment, the laser 300 is incident into the optical splitting film layer, to enlarge the divergence angle of the laser 300 through the scattering particles in the optical splitting film layer. Meanwhile, the laser 300 is partially reflected and partially transmitted through the Fresnel reflection phenomenon of the glass material in the optical splitting film layer. The reflected laser 300 serves as the first wavelength beam 310. The transmitted laser 300 serves as the excitation light to excite the fluorescent material of the wavelength conversion element 200 to form the second wavelength beam 320. The first wavelength beam 310 and the second wavelength beam 320 both pass through the scattering particles of the optical splitting film layer, so that the divergence angles of the first wavelength beam 310 and the second wavelength beam 320 are both greater than the divergence angle of the laser 300, thereby resulting in a relatively high color uniformity of the combined light formed by the first wavelength beam 310 and the second wavelength beam 320.

Figure 4:
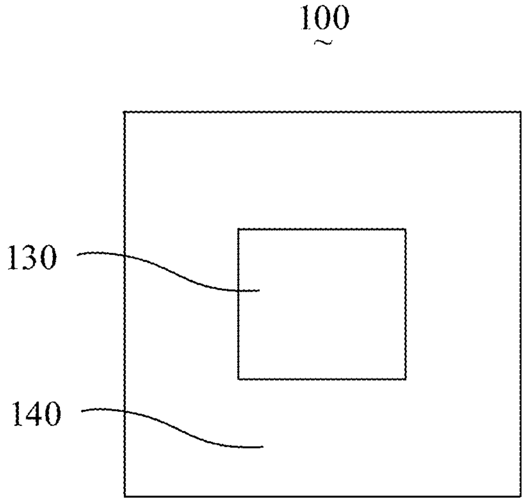
FIG. 4 is a schematic structural diagram of an optical splitting element according to an embodiment of the present disclosure.

FIG. 4 is a schematic structural diagram of an optical splitting element 100 according to an embodiment of the present disclosure.

Further, the optical reflectivity of the middle region 130 of the optical splitting element 100 is less than the optical reflectivity of the peripheral region 140 of the optical splitting element 100. In the related art, the central light of the light spots formed by the laser are relatively strong, and the light around the central light is relatively weak. Therefore, the energy distribution of the beams irradiated on the wavelength conversion element is strong at the center and weak at the edges. Therefore, the excitation light at the center is relatively strong, and thus has a strong capability of exciting the fluorescent material, while the excitation light that does not participate in the excitation and the excited light formed by exciting the fluorescent material are mixed to generate the first mixed light. The power density of the light spot at the edge is low, and the excitation light is weak. Most of the excitation light participates in exciting the fluorescent material to generate the excitation light, while less excitation light does not participate in excitation. Eventually, the second mixed light is generated by mixing the excitation light that does not participate in excitation and the excitation fluorescent material that excites the fluorescent material. Since the energy distribution of the excitation light beam is strong at the center and weak at the edges, there are differences in color and energy distribution of the first mixed light and the second mixed light, and ultimately the mixed light generated by the laser has a large color difference and poor uniformity. Taking the yellow wavelength conversion element excited by blue laser as an example, the first mixed light color may be biased towards blue, while the second mixed light color may be biased towards yellow. The generated mixed light is biased towards blue and brightness in the center and biased towards yellow and darkness at the edges. In the present disclosure, by enhancing the reflectivity of the middle region 130 of the optical splitting element 100, the transmittance of the middle region 130 of the optical splitting element 100 is reduced. As a result, the differences between the second wavelength beam 320 generated by the wavelength conversion elements 200 at different positions can be reduced, and the combined light formed by mixing the first wavelength beam 310 and the second wavelength beam 320 can have a higher color uniformity. The area of the middle region 130 can be set according to actual needs.

Figure 5:
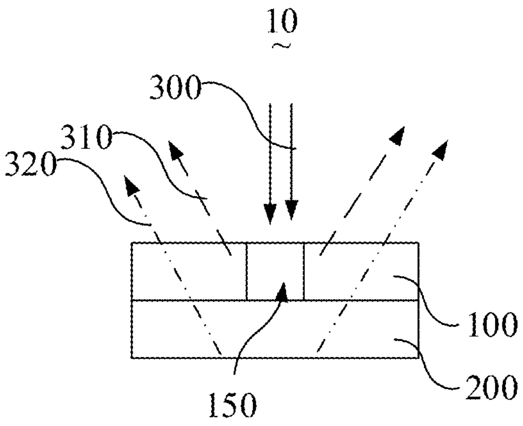
FIG. 5 is a schematic structural diagram of a laser light combining apparatus according to an embodiment of the present disclosure.

FIG. 5 is a schematic structural diagram of a laser light combining apparatus 10 according to an embodiment of the present disclosure.

Further, the middle region 130 of the optical splitting element 100 is provided with a through hole 150, to reduce the reflectivity of the middle region 130 of the optical splitting element 100 through the through hole 150. The size of the through hole 150 can be set according to the size of the light spot of the laser 300. The radial dimension of the through hole 150 can be less than or equal to the size of the light spot of the laser 300. The central beam of the laser 300 may enter the wavelength conversion element 200 through the through hole 150, and the wavelength thereof can be converted through the wavelength conversion element 200, to form the second wavelength beam 320. Moreover, since the central beam of the laser enters the wavelength conversion element 200 through the through hole 150, the second wavelength beam 320 generated by the middle region 130 of the wavelength conversion element 200 is relatively strong. Therefore, the light spot combined by the first wavelength beam 310 and the second wavelength beam 320 satisfies the characteristics of relatively strong illumination in the center and relatively weak illumination in the edge region.

Figure 6:
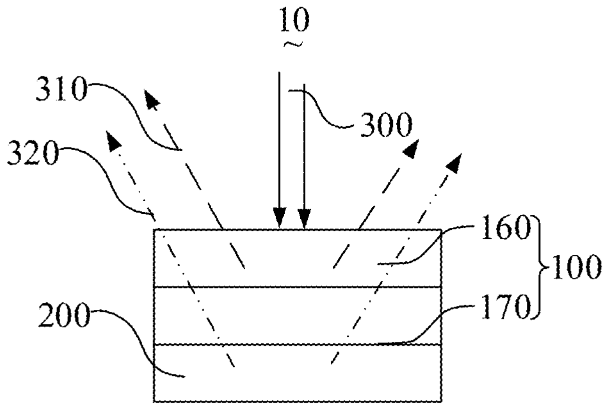
FIG. 6 is a schematic structural diagram of a laser light combining apparatus according to an embodiment of the present disclosure.

FIG. 6 is a schematic structural diagram of a laser light combining apparatus 10 according to an embodiment of the present disclosure.

The optical splitting element 100 includes frosted glass 170. The surface of the side of the frosted glass close to the wavelength conversion element 200 is atomized, and the surface of the side of the frosted glass away from the wavelength conversion element 200 is provided with an anti-reflection coating 160 in the middle region 130 of the surface. The central beam of the laser 300 is irradiated to the middle region 130 of the optical splitting element 100. The anti-reflection coating 160 disposed in the middle region 130 of the optical splitting element 100 increases the light transmittance of the middle region 130 of the optical splitting element 100 through the anti-reflection coating 160, so that the optical reflectivity of the middle region 130 of the optical splitting element 100 is smaller than the optical reflectivity of the peripheral region 140 of the optical splitting element 100. Therefore, in the present disclosure, the anti-reflection coating 160 is provided to enhance the reflectivity of the middle region 130 of the optical splitting element 100, and thus reduce the transmittance of the middle region 130 of the optical splitting element 100, so that the difference between the second wavelength beam 320 generated by the wavelength conversion elements 200 at different positions can be reduced, and the color uniformity of the combined light formed by mixing the first wavelength beam 310 and the second wavelength beam 320 is relatively high.

Figure 7:
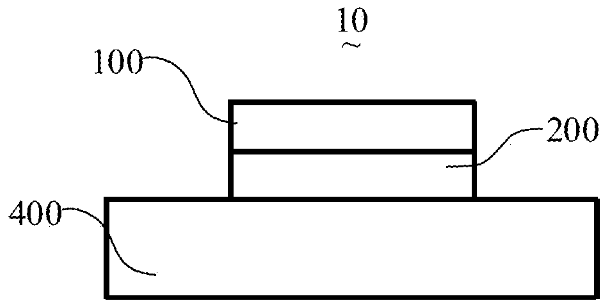
FIG. 7 is a schematic structural diagram of a laser light combining apparatus according to an embodiment of the present disclosure.

FIG. 7 is a schematic structural diagram of a laser light combining apparatus 10 according to an embodiment of the present disclosure.

The laser light combining apparatus 10 in the present disclosure may further include a heat dissipation substrate arranged on a side of the wavelength conversion element away from the optical splitting element. The heat dissipation substrate is configured to carry the wavelength conversion element. The heat generated by the wavelength conversion element during operation can be diffused through the heat dissipation substrate.

As above, the laser light combining apparatus 10 according to the present disclosure has a simple combining method, a compact structure, and low manufacturing costs. Moreover, the optical reflectivity of the middle region 130 of the optical splitting element 100 is smaller than the optical reflectivity of the peripheral region 140 of the optical splitting element 100, so that the color uniformity of the obtained combined light can be relatively high.

Figure 8:
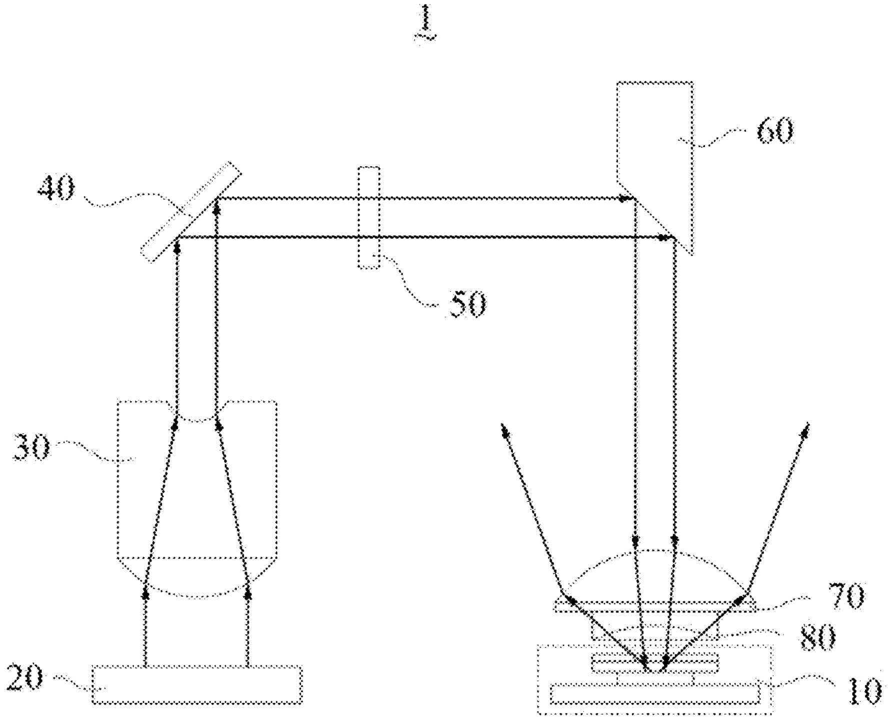
FIG. 8 is a schematic structural diagram of a light source according to an embodiment of the present disclosure.

FIG. 8 is a schematic structural diagram of a light source according to an embodiment of the present disclosure.

The light source 1 includes a laser device 20 and the above-mentioned laser light combining apparatus 10. The laser device 20 is configured to emit laser. The laser light combining apparatus 10 is configured to receive the laser light, separate and convert it, and then combine the light to form the combined light of the first wavelength beam and the second wavelength beam.

Further, the light source 1 may include a compressing lens 30, a mirror 40, a diffuser 50, a reflecting prism 60, and a collecting lens 70.

The compressing lens 30 is provided at a light exit side of the laser device 20, and configured to compress the light spot of the laser emitted from the laser device 20 along the first light path. The mirror 40 is provided at a light exit side of the compressing lens 30, and configured to reflect the compressed laser to form laser propagating along the second optical path. The diffuser 50 is arranged in the second optical path, and configured to diffuse laser propagating along the second optical path. The reflecting prism 60 is arranged in the second optical path. The diffuser 50 is located between the mirror and the reflecting prism. The reflecting prism 60 is configured to reflect the diffused laser propagating along the second optical path to form the laser propagating along the third optical path. The collecting lens 70 is arranged in the third optical path. The collecting lens 70 is located between the reflecting prism 60 and the laser light combining apparatus 10, and configured to collect laser propagating along the third optical path and guide the laser propagating along the third optical path to the laser light combining apparatus 10.

In an embodiment, the compressing lens 30 is a cylindrical with one end being convex and the other end being concave. The laser emitted from the laser device 20 is compressed through the convex surface of the lens 30, then guided by the cylindrical to the concave surface, and eventually collimated and emitted. It can be understood that the cylindrical length of the compressing lens 30 can be configured such that the light is refracted by the convex and then by the concave, and eventually collimated and emitted.

The light source 1 may further include a diaphragm 80. The diaphragm 80 may be provided between the collecting lens 70 and the laser light combining apparatus 10. The diaphragm 80 can be configured to control the size and color uniformity of the light spot incident onto the laser light combining apparatus 10.

The principles and implementations of the present disclosure are described herein through specific examples. The above embodiments are just used to facilitate understanding the method and core idea of the present application. For those skilled in the art, according to the ideas of the present disclosure, there may be changes in any specific implementation and application scope. In conclusion, the content of the present specification should not be construed as limiting the present disclosure.

What is claimed is:

1. A laser light combining apparatus comprising an optical splitting element and a wavelength conversion element;

wherein the optical splitting element is configured to reflect a portion of laser incident at a side of the optical splitting element away from the wavelength conversion element to form a first wavelength beam, and transmit an unreflected portion of the laser to the wavelength conversion element;

wherein the wavelength conversion element is configured to perform wavelength conversion on the unreflected portion of the laser to form a second wavelength beam, and reflect the second wavelength beam to the optical splitting element, so that the second wavelength beam and the first wavelength beam form a combined light;

wherein a divergence angle of the first wavelength beam and a divergence angle of the second wavelength beam are both greater than a divergence angle of the laser; and wherein an angle overlapping area of the divergence angle of the first wavelength beam and the divergence angle of the second wavelength beam is greater than or equal to 80%, and the angle overlapping area of the divergence angle of the first wavelength beam and the divergence angle of the second wavelength beam is calculated by:

overlapping area volume/(overlapping area volume+non-overlapping area volume).

2. The laser light combining apparatus according to claim 1, wherein the optical splitting element comprises frosted glass, and a side surface of the frosted glass close to the wavelength conversion element and a side surface of the frosted glass away from the wavelength conversion element are both atomized.

3. The laser light combining apparatus according to claim 1, wherein the optical splitting element comprises a glass layer and a scattering layer, and the glass layer is arranged between the scattering layer and the wavelength conversion element.

4. The laser light combining apparatus according to claim 1, wherein the optical splitting element comprises a diffuser.

5. The laser light combining apparatus according to claim 4, wherein the diffuser is formed by adding chemical particles as scattering particles into diffusion film substrate, and the scattering particles are located in the diffusion film substrate.

6. The laser light combining apparatus according to claim 1, wherein the optical splitting element comprises an optical splitting film layer, and the optical splitting film layer is adhered to a fluorescent layer of the wavelength conversion element and comprises glass material and scattering particles doped in the glass material.

7. The laser light combining apparatus according to claim 6, wherein the optical splitting film layer comprises glass material, scattering particles are doped in the glass material, and the scattering particles comprises $TiO_2$, $Al_2O_3$, and pores.

8. The laser light combining apparatus according to claim 6, wherein the wavelength conversion element comprises a fluorescent layer and a reflective layer, the fluorescent layer is provided between the optical splitting element and the reflective layer, the fluorescent layer is made of fluorescent material, and the optical splitting film layer is bonded to the fluorescent material of the fluorescent layer.

9. The laser light combining apparatus according to claim 1, wherein the wavelength conversion element comprises a fluorescent layer and a reflective layer, and the fluorescent layer is provided between the optical splitting element and the reflective layer.

10. The laser light combining apparatus according to claim 1, wherein the optical splitting element is formed by mixing titanium dioxide and pores in glass material.

11. The laser light combining apparatus according to claim 1, wherein the laser light combining apparatus comprises a heat dissipation substrate arranged on a side of the wavelength conversion element away from the optical splitting element.

12. A laser light combining apparatus comprising an optical splitting element and a wavelength conversion element, wherein the optical splitting element is configured to reflect a portion of laser incident at a side of the optical splitting element away from the wavelength conversion element to form a first wavelength beam, and transmit an unreflected portion of the laser to the wavelength conversion element;

wherein the wavelength conversion element is configured to perform wavelength conversion on the unreflected portion of the laser to form a second wavelength beam, and reflect the second wavelength beam to the optical splitting element, so that the second wavelength beam and the first wavelength beam form a combined light;

wherein a divergence angle of the first wavelength beam and a divergence angle of the second wavelength beam are both greater than a divergence angle of the laser; and wherein an optical reflectivity of a middle region of the optical splitting element is less than an optical reflectivity of a peripheral region of the optical splitting element.

13. The laser light combining apparatus according to claim 12, wherein a middle region of the optical splitting element is provided with a through hole.

14. The laser light combining apparatus according to claim 13, wherein a radial dimension of the through hole is less than or equal to a size of a light spot of the laser.

15. The laser light combining apparatus according to claim 12, wherein the optical splitting element comprises frosted glass, a side surface of the frosted glass close to the wavelength conversion element is atomized, and a side surface of the frosted glass away from the wavelength conversion element is provided with an anti-reflection coating in a middle region thereof.

16. The laser light combining apparatus according to claim 12, wherein the wavelength conversion element comprises a fluorescent layer and a reflective layer, and the fluorescent layer is provided between the optical splitting element and the reflective layer.

17. The laser light combining apparatus according to claim 12, wherein the optical splitting element is formed by mixing titanium dioxide and pores in glass material.

18. A light source, comprising:

a laser device;

a laser light combining apparatus;

a compressing lens arranged at a light exit side of the laser device and configured to compress a light spot of laser emitted from the laser device along a first light path;

a mirror arranged at a light exit side of the compressing lens and configured to reflect the compressed laser, to form laser propagating along a second optical path;

a diffuser arranged in the second optical path and configured to diffuse the laser propagating along the second optical path;

a reflecting prism arranged in the second optical path configured to reflect the diffused laser propagating along the second optical path to form laser propagating along a third optical path, wherein the diffuser is located between the mirror and the reflecting prism; and a collecting lens arranged in the third optical path, wherein the collecting lens is located between the reflecting prism and the laser light combining apparatus, and configured to collect the laser propagating along the third optical path and guide the laser propagating along the third optical path to the laser light combining apparatus, wherein the laser light combining apparatus comprises an optical splitting element and a wavelength conversion element;

wherein the optical splitting element is configured to reflect a portion of laser incident at a side of the optical splitting element away from the wavelength conversion element to form a first wavelength beam, and transmit an unreflected portion of the laser to the wavelength conversion element;

wherein the wavelength conversion element is configured to perform wavelength conversion on the unreflected portion of the laser to form a second wavelength beam, and reflect the second wavelength beam to the optical splitting element, so that the second wavelength beam and the first wavelength beam form a combined light;

wherein a divergence angle of the first wavelength beam and a divergence angle of the second wavelength beam are both greater than a divergence angle of the laser; and wherein the laser device is configured to emit laser; the laser light combining apparatus is configured to receive the laser, separate and convert the laser and then combine to form a combined light of the first wavelength beam and the second wavelength beam; and wherein the light source comprises a diaphragm provided between the collecting lens and the laser light combining apparatus.

19. The laser light combining apparatus according to claim 18, wherein the compressing lens is a cylindrical with one end being convex and the other end being concave, and the laser emitted from the laser device is compressed through the convex end of the lens, then guided by the cylindrical to the concave end, and eventually collimated and emitted.

* * * * *